UNITED STATES PATENT OFFICE 2,278,493

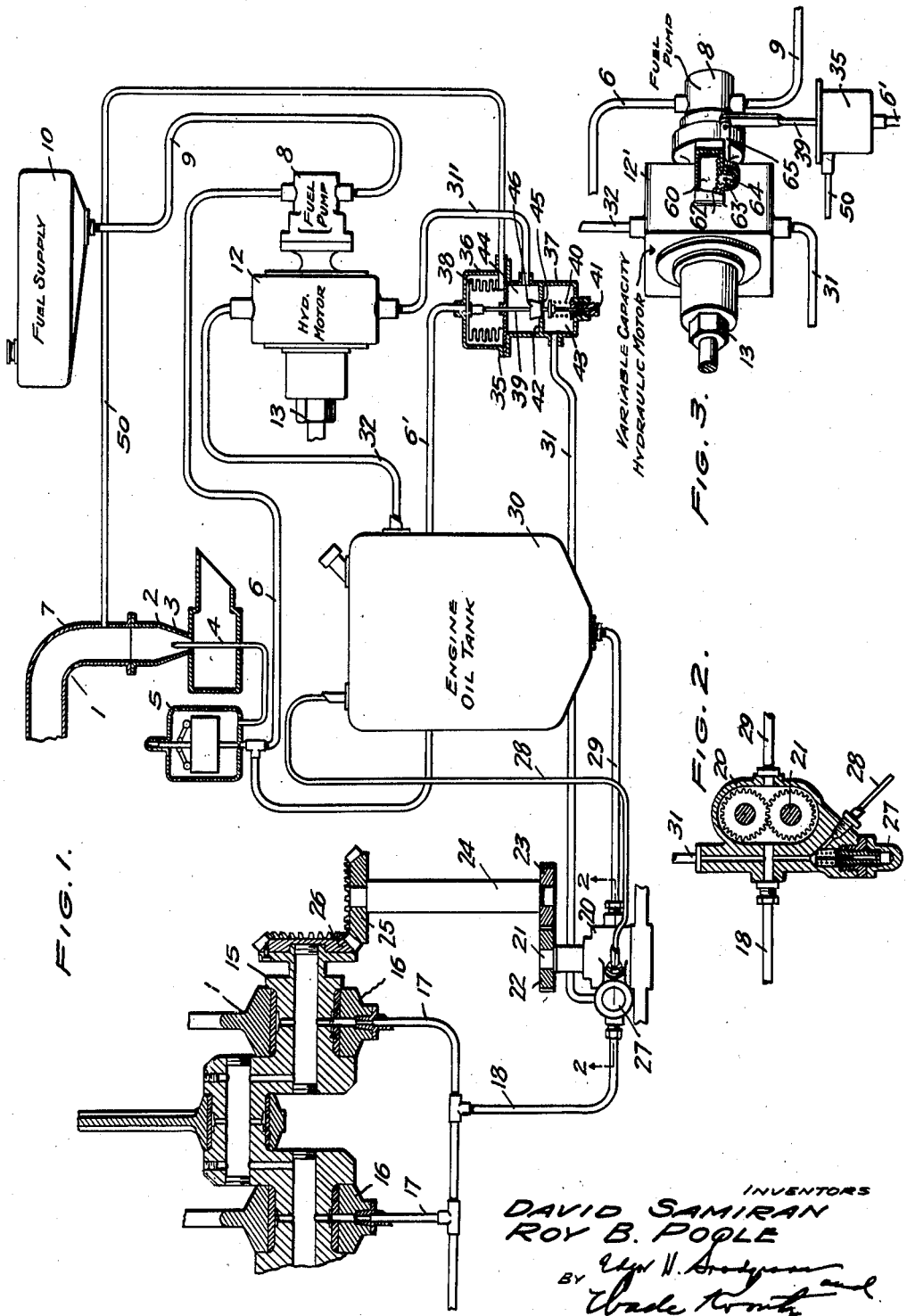

HYDRAULIC DRIVE FUEL SYSTEM

David Samiran and Roy B. Poole, Dayton, Ohio

Application March 4, 1941, Serial No. 381,690

6 Claims. (Cl. 123—140)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a fuel system for an internal combustion engine employing a variable speed hydraulic drive for the fuel pump and particularly well adapted for use in aircraft intended for use at high altitudes.

Many difficulties due to vapor locking in the fuel systems of aircraft intended to operate at high altitudes have occurred and these difficulties are traceable to two sources. The first type arises by employing a fuel pump mounted on and directly driven by the engine, with the mean fuel level in the tanks such that the pump is required to exert a suction lift which at high altitudes exceeds the vapor pressure of the fuel and the line flow resistance at high altitudes, causing the fuel to vaporize and unprime the pump. A second type of failure arises by employing a relief valve to maintain a constant fuel pressure in the pump delivery conduit which allows the fuel to vaporize and form bubbles which escape back into the delivery conduit as well as passing by way of the pump by-pass into the pump inlet, causing the pump to become unprimed.

We are aware that it has been proposed to employ a variable speed hydraulic transmission to drive a fuel pump located remote from the aircraft engine and so positioned that the pump need exert little or no suction lift. By employing a pressure responsive control, responsive to variation in fuel pressure in the delivery conduit preferably at the point of delivery, for controlling the speed of the driven end of the hydraulic transmission and fuel pump, the fuel pressure may be maintained constant irrespective of the demand for fuel, thus eliminating the relief valve and by-pass heretofore associated with the fuel pump. Such a type of fuel system is disclosed in United States Patent No. 2,229,132 granted to David Samiran and in our copending application Serial No. 380,396 filed February 24, 1941, for "Aircraft fuel systems." The patented fuel system and at least one of the fuel systems illustrated in our above noted copending application requires the use of an external engine driven pump to serve as the pressure generator or driving end of the variable speed hydraulic transmission used to drive the fuel pump. The use of a separate engine driven pump for the driving end of the hydraulic transmission necessarily increases the weight and cost of the fuel system as well as complicates the already overburdened accessory driving system of the present type aircraft engines. The present invention eliminates the necessity of employing a separate engine driven pressure generator or pump for the driving element of the hydraulic transmission by employing the pressure oiling system of the engine as a source of motive fluid for the hydraulic transmission. The hydraulic transmission fluid circuit includes a pressure conduit for transmitting motive fluid to the hydraulic motor or driven end of the variable speed hydraulic transmission, and a return conduit for returning oil discharged by the hydraulic motor back to the return side of the engine oiling system. A pressure responsive means responsive to the variation in the fuel pressure in the fuel pump delivery conduit from a predetermined value is employed to control the pressure drop across the hydraulic motor to thereby vary its speed to maintain the fuel pump output pressure at a selected point in the delivery conduit substantially constant. The invention also contemplates the use of a modifier in conjunction with the pressure responsive control means, whereby the modifier is responsive to a pressure such as the engine intake manifold pressure, so that the net control effect is dependent on the existing pressure differential between the manifold pressure and the fuel pressure in the delivery conduit.

The invention also provides a modified construction in which the hydraulic motor is of the variable capacity type and having a means to vary the capacity to thereby alter the pressure drop across the motor to vary its speed i. e., with the constant pressure source of motive fluid the motor speed will increase with decrease of capacity and vice versa. The capacity control means is directly actuated by a pressure responsive control means in the same manner as in the previously described fuel pump drive.

The principal object of the invention is the provision of a fuel system for an internal combustion engine having a pressure oiling system, including a source of fuel supply, a delivery conduit, a fuel pump for pumping fuel from said source to said conduit under pressure for consumption by the engine, a hydraulic motor for driving the pump, a fluid circuit connecting the hydraulic motor and the engine oiling system and control means responsive to the variation in the delivery pressure of fuel in said delivery conduit from a predetermined pressure for controlling the flow of oil through said fluid circuit to thereby vary the speed of said hydraulic motor and the output of said fuel pump.

Another object of the invention is the provision in a fuel system of the character described including a fuel pump and a hydraulic motor for driving the fuel pump, of a fluid circuit connecting the hydraulic motor to the engine oiling system to receive motive fluid under pressure therefrom, of control means responsive to the variations in pressure of the fuel at the point of delivery from a predetermined value for controlling the pressure drop across said hydraulic motor and thereby controlling its speed and the output of said fuel pump.

A further object of the invention is the provision in a fuel system of the character described having a fuel pump driven by a hydraulic motor connected to the engine oiling system through a fluid circuit, of pressure responsive means for controlling the flow of oil through said circuit in accordance with the differential between the pressure of the fuel at the point of delivery and a reference fluid pressure indicative of engine load.

Other objects of the invention not specifically enumerated above will appear by reference to the detailed description in the specification and to the appended drawing in which:

Fig. 1 is a diagrammatic illustration of the principal elements of a fuel system in accordance with the invention; and Fig. 2 is a sectional view taken on line 2—2 of Fig. 1, illustrating details of a portion of the engine oiling system; and Fig. 3 is a perspective view illustrating a modified form of variable speed drive for the fuel pump of Fig. 1, employing a variable capacity hydraulic motor.

Referring now to Figure 1, the reference numeral 1 generally indicates an internal combustion engine having a carburetor generally indicated by the reference numeral 2, the carburetor being provided with the conventional air inlet and venturi 3 and a fuel jet 4 supplied with fuel from the conventional float chamber 5, the combustible mixture being supplied to the engine intake manifold 7. The float chamber is provided with fuel by means of a delivery conduit 6, connected to the delivery side of a positive displacement fuel pump 8, which has its inlet side connected by means of conduit 9 to a source of fuel supply 10, which may comprise one or more fuel tanks delivering fuel to a collector not shown. The positive displacement fuel pump 8 is adapted to be driven at varying speeds by means of a hydraulic motor 12 provided with a tachometer take off drive 13, adapted to drive a tachometer not shown, to indicate the rate of fuel consumption in terms of the pump velocity. The hydraulic motor 12 is supplied with motive fluid from a fluid circuit connected to the oiling system of the engine 1, in a maner now to be described.

The engine 1 is provided with the conventional drilled crank shaft 15 rotatably mounted in bearings 16, which are supplied with lubricating oil under pressure from conduits 17 connected in parallel to a conduit 18, which in turn is connected to the output or high pressure side of a conventional oil pump 20. The oil pump 20 is adapted to be driven by means of a shaft 21 and gears 22 and 23 from an extension shaft 24, in turn driven from the engine crank shaft by means of the bevel gears 25 and 26. The oil pump 20 is provided with a pressure relief valve 27, which is adapted to by-pass oil from the pressure side of the pump by means of a conduit 28 to the engine oil tank 30, to thereby maintain the pressure at the delivery side of the pump substantially constant (see also Fig. 2). The pump 20 receives its oil supply by means of the conduit 29, connected to the sump of the oil tank 30. Oil under pressure from the delivery side of the pump 20 is also delivered to a pressure conduit 31 (see also Fig. 2) which serves in conjunction with the conduit 31' to deliver oil under pressure to the hydraulic motor 12, the oil discharged by the motor being returned to the engine oiling system through the conduit 32 connected to the engine oil tank 30. The speed of rotation of the hydraulic motor 12 is controlled by regulating the flow of oil through the pressure conduits 31 and 31' by means of a pressure responsive control device generally indicated by the reference numeral 35. The pressure responsive control device 35 comprises a sealed housing 36 having an extension housing or valve chamber 37 secured thereto, the housing 36 inclosing a flexible metal bellows 38, which is secured at one end to an end wall of the housing 36 and having its other end connected to a control rod 39 projecting through the end wall of the housing 36 into the valve casing 37 and urged in one direction by means of a compression spring 40 concentric with the control rod 39, the loading of which is varied by adjustment of the threaded abutment 41. The valve casing 37 is provided with a central wall 42 dividing the casing into chambers 43 and 44, which are in communication by means of a valve port 45 formed in the wall 42 and the communication between the chambers being controlled by means of a throttle valve 46 concentrically mounted on the control rod 39. The chamber 43 is adapted to receive oil under pressure from the conduit 31 and oil discharged from the chamber 43 to the chamber 44 through valve port 45 is conducted to the hydraulic motor 12 through the conduit 31' connected thereto. The space inclosed between the outer portion of the bellows 38 and the interior of the housing 36 is in communication with the pressure in the fuel delivery conduit 6 at the point of delivery to the float chamber 5, by means of the branch conduit 6', and the interior of the bellows 38 is connected by means of a conduit 50 to the intake manifold 7 of the engine 1. It will be seen that the force exerted upon the control rod 39 in opposition to the loading of the spring 40 will be equal to the force exerted on the bellows by the differential in pressure between the fuel pressure acting on the outside of the bellows and the intake manifold pressure acting on the inside of the bellows, the resultant control force tending to move the throttle control valve 46 relative to the port 45, to thereby control the flow of oil to the hydraulic motor 12.

*Operation*

The operation of the device of Figure 1 is as follows:

The engine is started by means of fuel pumped to the carburetor by means of a conventional hand pump, not shown and after the engine starts the oil pump 20 builds up pressure in the conduits 30 and 31', to deliver oil to the hydraulic motor 12, the throttle valve 45 being held in the open position by the spring 40. The hydraulic motor 12, upon receiving motive fluid under pressure from the engine oiling system will drive the pump 8 to deliver fuel to the float chamber 5 through the delivery conduit 6, and as the fuel pressure increases the bellows 38 will be forced downward to move the throttle valve 46 in the closing direction to thereby govern the speed of the hydraulic motor 12 to maintain the quantity of fuel pumped by the fuel pump 8 to the carburetor 2, in exactly the right amount to supply the engine fuel demand and still maintain the fuel pressure at the point of delivery to the carburetor constant at a predetermined value, for example, five pounds per sq. in. Where the engine is employed to propel an aircraft, the engine load and hence the fuel demand will vary greatly under the different flight conditions, so that in order to maintain the fuel pressure constant at the point of delivery, it is necessary that the speed of the pump 8 be varied by the pressure responsive control device 35 exactly in accordance with the fuel demand. In order to prevent over regulation or "hunting" it has been determined that the control effect should depend upon the differential in pressure between the engine manifold pressure (indicative of engine load) and the fuel pressure at the point of delivery, rather than by the relation of the fuel pressure to the pressure of the outside atmosphere, so that although the aircraft is ascending, the changes in atmospheric pressure will not directly effect the response of the control device 35, and the control of the fuel system will be in response to changes in the engine load, as well as variation in fuel pressure from the predetermined pressure set by the adjustment of the loading of the spring 40. The provision of the means for subjecting the interior of the bellows 38 to the engine manifold pressure serves as a modifier for the action of the bellows under the influence of the fuel pressure admitted to the housing 36.

It will be noted that by employing the engine oiling system as a source of motive fluid for the hydraulic transmission for driving the fuel pump 8, it is not necessary to employ a separate engine driven pressure generator in the hydraulic circuit, thus materially reducing the weight and complication of the fuel system and further, the pressure relief valve of the engine oiling pump prevents any excessive rise in pressure in the hydraulic drive and further serves as a torque limiting device for the hydraulic motor 12, since the pressure in the hydraulic driving system can never exceed the pressure existing at the output side of the lubricating pump 20. While the device of Figure 1 has been illustrated as incorporating a throttle valve in the pressure side of the hydraulic circuit for controlling the speed of the motor 12, it is obvious that the motor speed could be controlled in exactly the same manner by placing the throttle valve in the exhaust or discharge conduit 32, since in either case the pressure drop across the motor 12 will be controlled to thereby vary the speed of the motor 12.

In a modified form of the invention is illustrated in Figure 3, the pressure drop across the motor 12' is controlled by varying the capacity of the hydraulic motor driving the pump 8, in place of the use of a throttle valve. As seen in Figure 3, the variable capacity hydraulic motor 12', which may be any suitable type such as a vane type motor having a stator shiftable eccentrically with respect to the vaned rotor is provided with a control rod 60, projecting from the motor housing and being provided with rack teeth 62, which mesh with the teeth of a pinion gear 63 mounted on a shaft 64, which is rotated by means of lever 65 to thereby cause axial shifting of the capacity control rod 60 in either direction, in accordance with the displacement of the lever. The lever 65 is pivotally connected directly to the control rod 39 of the pressure responsive control device 35 (Fig. 1) so that the control device directly changes the capacity of the motor 12', in a manner such that the speed of the motor is increased by reducing the motor capacity upon a decrease in fuel pressure and that the motor capacity is increased and the motor speed reduced upon an increase of fuel pressure above the predetermined value. The modified speed control illustrated in Figure 3 may be bodily inserted in the device of Figure 1 to replace the hydraulic motor 12 and its function. The variable capacity hydraulic motor 12' having its inlet connected directly to the conduit 31, to receive oil under pressure from the engine oiling system and having its outlet connected directly to the discharge conduit 32, the connections of the fuel pump 8 to the conduits 6 and 9, and the connection of the pressure responsive device 35 to the conduits 6' and 50 respectively, are made in exactly the same manner as in the fuel system of Figure 1, the complete fuel system not being illustrated because the insertion of the modified drive of Figure 3 to serve its proper function in the fuel system of Figure 1, is believed to be sufficiently clear so as not to require separate illustration.

While the preferred forms of our invention have been illustrated and described, it will be apparent to those skilled in the art that other modifications and changes may be made therein falling within the scope of the invention as defined by the appended claims.

We claim:

1. A fuel system for an internal combustion engine having a relief valve controlled pressure oiling system comprising, a source of fuel supply, a constant displacement fuel pump connected to said supply, a fuel conduit connnected to the output side of said pump for conducting fuel under pressure to the engine for consumption thereby, a hydraulic motor for driving said pump, a fluid circuit connecting said engine oiling system and said motor including an oil pressure conduit and an oil return conduit, a throttle valve in said pressure conduit for controlling the admission of motive fluid to said motor, and pressure responsive means responsive to variation in fuel pressure in said fuel conduit from a predetermined value for controlling said valve means to thereby control the speed of said hydraulic motor and said fuel pump to maintain the fuel pressure in said fuel conduit substantially constant.

2. A fuel system for an internal combustion engine having a relief valve controlled pressure oiling system comprising, a source of fuel supply, a delivery conduit, a constant displacement pump for pumping fuel from said source to said delivery conduit under pressure, a fluid actuated motor for driving said pump, a fluid circuit including a pressure conduit and a return conduit connecting said motor to said pressure oiling system, a throttle valve in said circuit for controlling the flow of oil through said motor from said oiling system and means responsive to the variation in the pressure of fuel in said delivery conduit for actuating said control valve.

3. The structure as claimed in claim 2, in which the pressure responsive means includes a modifier responsive to variation in engine intake manifold pressure, whereby said throttle valve is actuated in response to the differential between said last named pressure and the fuel pressure in the delivery conduit.

4. In a fuel system for an internal combustion engine having a relief valve controlled pressure oiling system and an intake manifold, a source of fuel supply, a delivery conduit for conducting fuel to the engine for consumption thereby, a fuel pump connected to said fuel supply and to said delivery conduit, a hydraulic motor connected to said pump to drive the same, a fluid circuit including a conduit connected to the pressure side of the engine oiling system and a discharge conduit connected to the return side of the oiling system, said hydraulic motor being serially connected to said conduits, and pressure responsive control means for controlling the drop in pressure between said conduits across said hydraulic motor to thereby vary the motor speed, said pressure responsive means being responsive to the variation in fuel pressure in said delivery conduit at the point of delivery.

5. In a fuel system for an internal combustion engine having a relief valve controlled pressure oiling system, a fuel supply, a conduit for conducting fuel under pressure to the engine for consumption thereby, a fuel pump connected to said supply and to said conduit, a variable capacity hydraulic motor for driving said pump, a fluid circuit connecting said motor and the engine oiling system to receive motive fluid under pressure therefrom, and pressure responsive control means responsive to variations in the fuel pressure at the point of delivery for varying the capacity of the hydraulic motor to thereby vary its speed and the delivery of the fuel pump.

6. The structure as claimed in claim 5, in which said pressure responsive control means includes a modifier for modifying the control effect thereof in response to the instant pressure in the engine intake manifold.

DAVID SAMIRAN.
ROY B. POOLE.